INVENTOR.
HUGH N. ROSS

INVENTOR.
HUGH N. ROSS
BY Herman L. Gordon
ATTORNEY

INVENTOR.
HUGH N. ROSS
BY Herman L. Gordon
ATTORNEY

United States Patent Office 2,913,902
Patented Nov. 24, 1959

2,913,902

RELATIVE HUMIDITY MEASURING APPARATUS

Hugh Neil Ross, Silver Spring, Md., assignor to American Instrument Company, Inc., Silver Spring, Md.

Application February 28, 1955, Serial No. 490,857

6 Claims. (Cl. 73—336.5)

This invention relates to devices for measuring relative humidity, and more particularly to a relative humidity recorder.

A main object of the invention is to provide a novel and improved apparatus for continuously measuring, indicating, and recording relative humidity, said apparatus being simple in construction, being automatic in operation, and providing a continuous record of temperature and relative humidity.

A further object of the invention is to provide an improved apparatus arranged to measure temperature and humidity, to compute relative humidity automatically from this data, and to provide a continuous record of temperature and relative humidity.

A still further object of the invention is to provide an improved device for continuously measuring temperature and humidity and for computing and continuously recording relative humidity, said device involving relatively few parts, being reliable in operation, and requiring substantially no human supervision.

Further objects and advantages of the invention will become apparent from the following description and claims, and from the accompanying drawings, wherein:

Figure 1 is a simplified block diagram of an apparatus for measuring, computing and recording relative humidity constructed in accordance with the present invention.

Figure 2 is a block diagram of a modified form of relative humidity measuring, computing and recording apparatus according to the present invention, wherein timed switching means is employed for intermittently connecting the various signal sources to the input of the amplifier, and wherein further timed switching means is employed to intermittently connect the output of the amplifier to the various adjusting motors forming part of the automatic relative humidity computer.

Relative humidity is defined as the ratio of actual humidity to the humidity required for saturation, at a given temperature, expressed as a percentage. Therefore, in order to determine relative humidity, it is necessary to measure actual humidity, to measure temperature, to determine the amount of humidity for saturation at that temperature (from a table or other means), and then to compute the relative humidity from the above ratio.

Humidity can be measured electrically by means of a suitable circuit employing a humidity-responsive sensing element. Likewise, temperature can be measured electrically by means of a suitable circuit employing a temperature-responsive sensing element.

Obviously, the amount of humidity for saturation at any temperature is a function of temperature, and the calculation of relative humidity may be performed mechanically by combining a signal representing humidity with a signal representing the aforesaid function of temperature in a suitable computing mechanism which responds to the combined signals and which is arranged to drive a suitable indicator calibrated in terms of relative humidity.

Therefore, a prime purpose of the present invention is to provide an apparatus which develops a signal representing humidity, which develops a signal representing temperature, which derives a signal representing an "error" relative humidity in accordance with the changes of temperature and humidity from reference values, which combines the last-named signal with the humidity signal in a computing mechanism, and which mechanically drives a recording indicator to a setting in terms of relative humidity.

Figure 1:
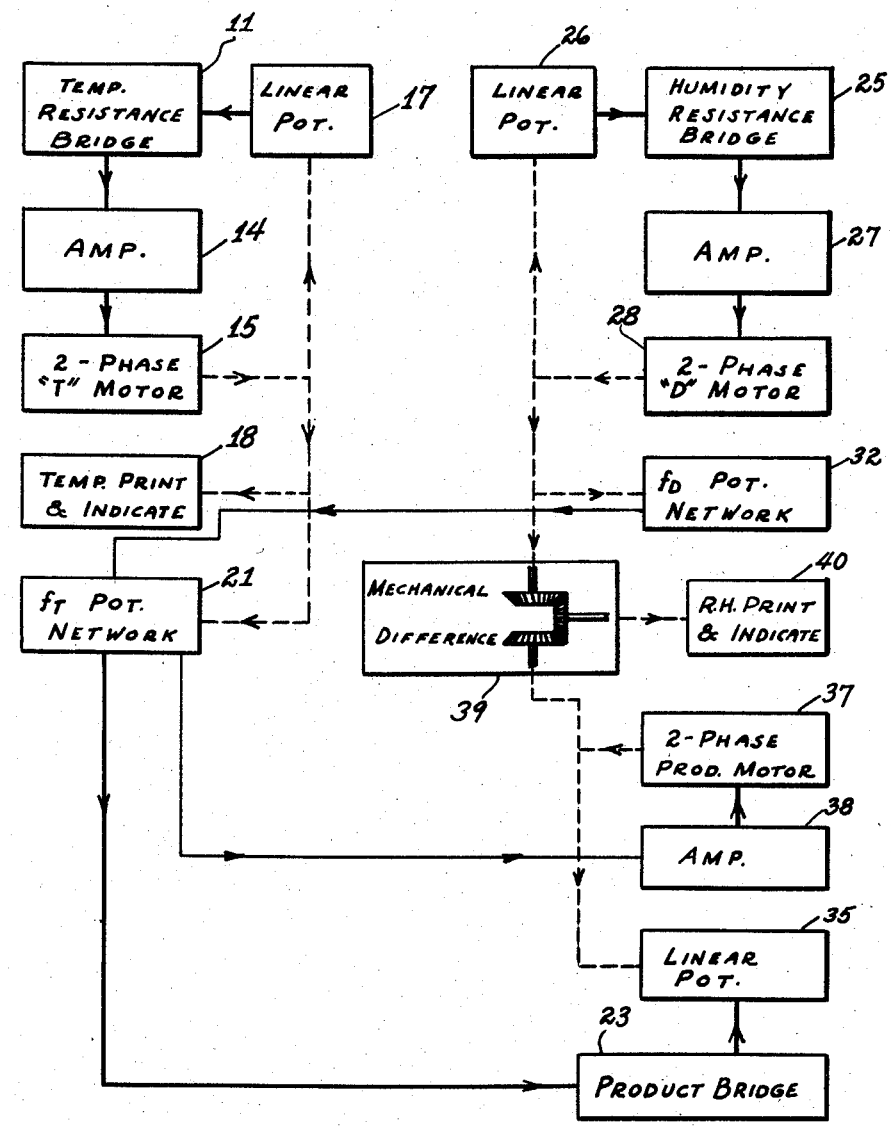
Figure 3:
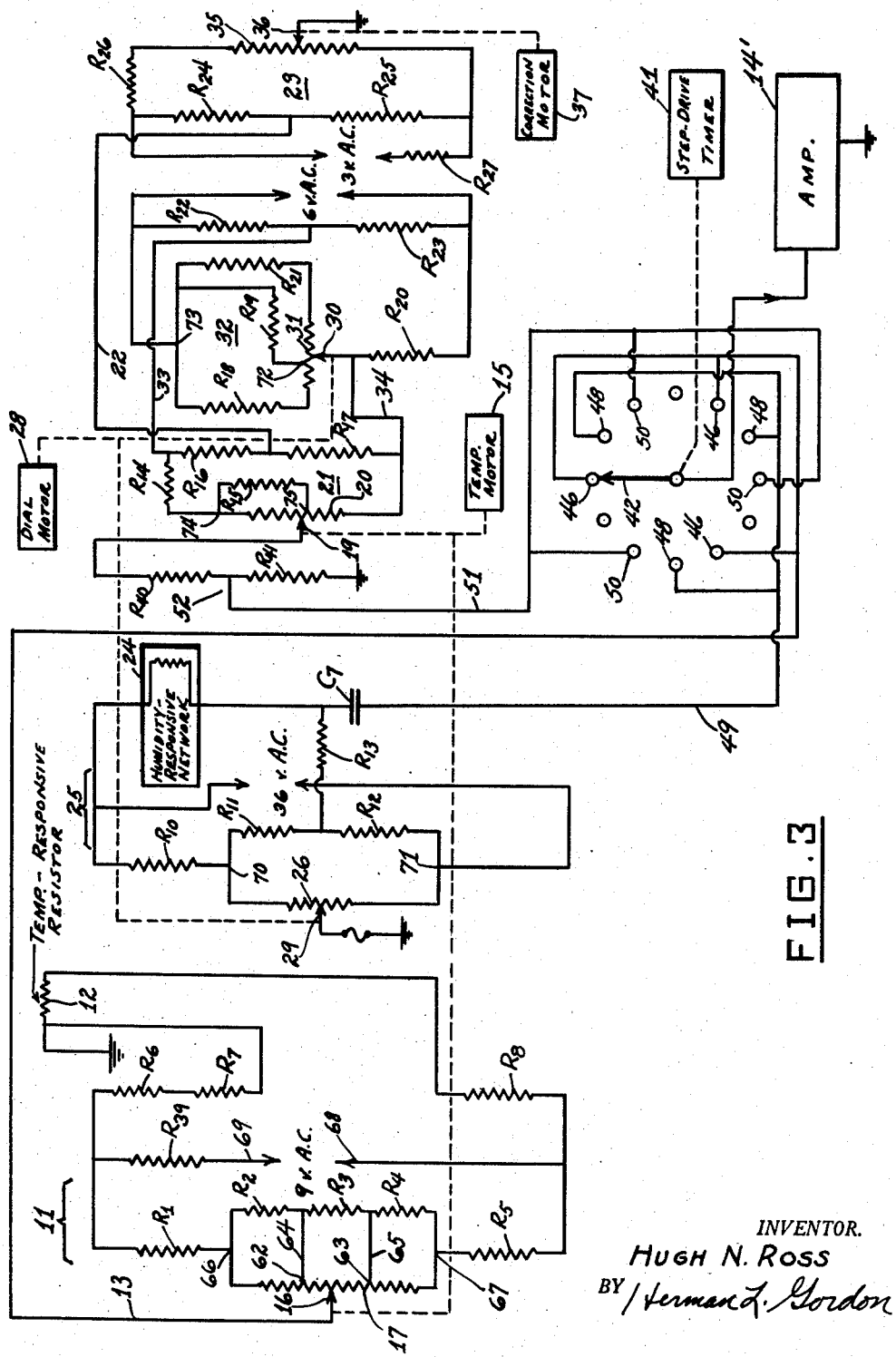
Figure 3 is a schematic wiring diagram of the temperature and humidity measuring circuits and of the related relative humidity computing circuits associated therewith, as employed in the form of the apparatus of Figure 2.

Referring to the drawings, and more particularly to Figure 1, showing a generalized form of relative humidity recording apparatus according to this invention, 11 designates a temperature-measuring bridge circuit to which is connected a temperature-sensitive resistance 12 exposed to ambient temperature, the temperature-sensitive resistance being connected to the bridge 11, for example, in the manner shown in Figure 3, and forming an impedance arm thereof, whereby a change in the value of resistance 12 from an initial value caused by a change in ambient temperature causes a signal current, corresponding to the temperature increment or reduction with respect to a reference value, to flow in the output wire 13 of the bridge.

Designated at 14 in Figure 1 is an amplifier. Wire 13 (Fig. 3) is suitably connected, in a manner to be presently described, to the input of the amplifier, and the amplifier is arranged to develop an output voltage governed in magnitude and phase by the input signal and thus by said temperature increment or reduction. Said output voltage is connected to one of the phases of a 2-phase adjusting motor 15, the other phase of said motor being energized from the line, as will be presently described. The output voltage of amplifier 14, which develops from a temperature change from a reference value, is suitably phased to cause rotation of the shaft of motor 15. Said shaft is coupled to the sliding contact 16 of a linear potentiometer (see Figure 3) connected as a part of bridge 11, the signal wire 13 being, for example, connected to contact 16, as shown. The output voltage of amplifier 14 caused by said temperature increment or reduction is phased to rotate the shaft of motor 15 toward a position wherein the bridge is rebalanced, in which position the signal voltage is zero.

The shaft of motor 15 is also coupled to a conventional indicating and printing device 18 calibrated to give instantaneous temperature readings and to provide a continuous record of temperature, or an intermittent record of temperature at successive equal time intervals.

The shaft of motor 15 is further coupled to the sliding contact 19 of a temperature-function potentiometer 20 connected in a network generally designated at 21. This network 21 is electrically connected, as by a wire 22, to an input terminal of a "product" bridge 23, whereby a temperature correction signal corresponding to the new temperature will be applied to bridge 23.

Designated at 24 is a humidity sensing element, for example, of the resistance type, which is electrically connected to and forming an impedance arm of a bridge circuit 25 having a rebalancing potentiometer 26. The output signal of bridge 25, representing the absolute humidity, is amplified by an amplifier 27, in Figure 1, and the output of amplifier 27, corresponding to the humidity, is employed to drive a 2-phase adjusting motor 28 whose shaft may be provided with a suitable indicating dial and is coupled to the sliding contact 29 of potentiometer 26, said motor 28 operating to rebalance bridge 25 in the same manner as motor 15 operates to rebalance bridge 11.

Also coupled to the shaft of motor 28 is the sliding contact 30 (Fig. 3) of a humidity-function ($f_D$) potentiometer 31 connected in a humidity-function network 32. Network 32 is interconnected with temperature-function network 21, as by wires 33 and 34 in Figure 3, to provide temperature and humidity-controlled signal input components in the product bridge 23.

Product bridge 23 is provided with the rebalancing potentiometer 35 whose sliding tap 36 is coupled to the shaft of a 2-phase adjusting motor 37. Motor 37 is driven by the output signal of product bridge 23, namely, the response of bridge 23 to the temperature correction signal from network 21, which is amplified by an amplifier 38 in Figure 1. The amplifier output signal is suitably phased to operate motor 37 in the same manner as motor 15 is operated by bridge 11 to move tap 36 of potentiometer 35 toward rebalancing position.

Designated at 39 is a mechanical subtracting device, for example, a conventional mechanical differential having an output shaft which is differentially operated by a pair of input shafts. One of the input shafts of the differential 39 is mechanically coupled to the humidity-controlled servo motor 28. The other input shaft of the differential is mechanically coupled to the shaft of the temperature-correction servo motor 37. As will be seen from Figure 1, and as explained above, the correcting motor 37 is operated by a correction signal which is a function of both temperature and humidity, whereby said correcting signal may be employed in conjunction with the humidity-controlled signal to derive relative humidity. Thus, the output member of differential 39 is moved not only by the humidity-controlled motor 28 but also by the temperature and humidity-controlled motor 37, so that the resultant motion thereof is in accordance with relative humidity rather than merely humidity alone. Said output member is coupled to a relative humidity indicator and recorder 40, which may be suitably calibrated to provide an instantaneous indication of relative humidity, as well as a continuous or intermittent record thereof.

In the generalized arrangement of Figure 1, separate amplifiers 14, 27 and 38 are employed to respectively energize the operating windings of the servo motors 15, 28 and 37 in response to changes from reference conditions. In the modified form of the invention, shown in Figures 2 and 3, a single amplifier 14' is employed, the input of the amplifier being intermittently connected in succession to the temperature resistance bridge 11, the humidity resistance bridge 25, and the product bridge 23, while at the same time, the output of the amplifier is connected respectively to the rebalancing coil of the temperature servo 15, the rebalancing coil of the humidity servo 28, and the rebalancing coil of the correction servo 37. This is accomplished by employing a step drive timing motor 41 which is drivingly coupled to the rotary contact arms 42 and 43 of a pair of rotary switches 44 and 45.

Figure 2:
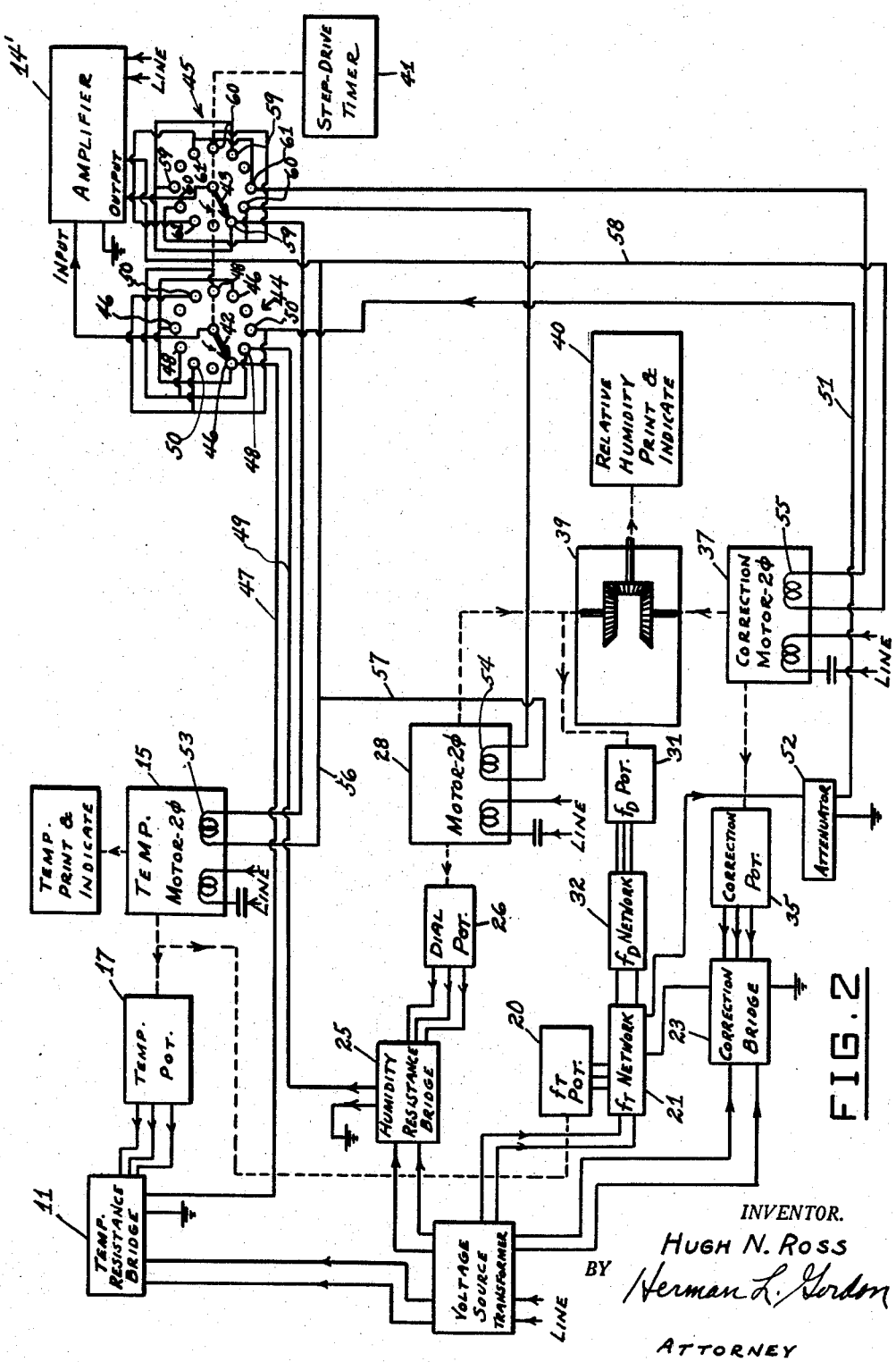

As shown in Figure 2, the rotary switch 44 has spaced contacts 46 connected to the output wire 47 of the temperature bridge 11. A successive set of spaced contacts 48 are connected to the output wire 49 of the humidity bridge 25. A next successive set of contacts 50 are connected to the output wire 51 of the correction network, which includes the correction bridge 23, the temperature-function ($f_T$) network 21, the humidity function ($f_D$) network 32, and an attenuator 52. The rotary switch arm 42 is connected to the input terminal of the amplifier 14'.

The rebalancing coils of the respective servo motors are shown respectively at 53, 54 and 55. Each of these coils has one terminal thereof connected to one of the output terminals of amplifier 14', as by the wires 56, 57 and 58. The other output terminal of the amplifier is connected to the rotary switch arm 43 of the switch unit 45. Switch unit 45 has spaced contacts 59 connected to the remaining terminal of the temperature servo coil 53, successive spaced contacts 60 connected to the remaining terminal of the humidity servo coil 54, and further successive spaced contacts 61 connected to the remaining terminal of the correction servo coil 55.

The rotary switch arm 43 is ganged with the rotary switch arm 42 and is driven simultaneously therewith in a stepwise fashion by the step-drive timing motor 41, the switch arms being synchronized so that at a first time step switch arm 42 engages a contact 46 at the same time that switch arm 43 engages a contact 59, at a next time step switch arm 42 engages a contact 48 while switch arm 43 engages a contact 60, at a next time step switch arm 42 engages a contact 50 while switch arm 43 engages a contact 61, and at a final time step the switch arms engage blank contacts, the above cycle being thereafter continuously repeated. Step-timing motor 41 is arranged to provide a sufficient dwell to allow the various servo motors to rebalance and to allow the operation of the temperature and relative humidity printing mechanism. Suitable means, not shown, is provided to cause said printing mechanism to operate at each time step. Said printing mechanism preferably includes a recording clock arranged so that the time is printed on the tape at least once each cycle along with each printed record of temperature and relative humidity provided at said cycle.

Referring now to Figure 3, it will be seen that the temperature bridge 11 comprises the fixed resistors $R_2$, $R_3$ and $R_4$ connected in series to the opposite terminals 66 and 67 of the winding of potentiometer 17. Said potentiometer winding has the taps 62 and 63 dividing the potentiometer winding into three equal zones. Tap 62 is connected by a wire 64 to the junction of resistors $R_2$ and $R_3$, and tap 63 is connected by a wire 65 to the junction of resistors $R_3$ and $R_4$.

As shown, one terminal of the temperature-responsive resistor 12 is grounded. Potentiometer terminal 66 is connected to ground through the series resistors $R_1$, $R_6$ and $R_7$. Potentiometer terminal 67 is connected to the opposite terminal of temperature-responsive resistor 12 through the resistors $R_5$ and $R_8$. An energizing alternating voltage, for example, 9 volts A.C. is applied to the temperature bridge at terminals 68 and 69 thereof. Terminal 68 is connected to the junction of resistors $R_5$ and $R_8$. Terminal 69 is connected through a resistor $R_{39}$ to the junction of resistors $R_1$ and $R_6$. As explained above, a change in resistance of the temperature-responsive resistor 12 develops a signal which is amplified and is ultimately applied to the operating winding of motor 15. The phase displacement of the applied signal causes the motor to rebalance bridge 11 and to adjust tap 19 of temperature function network 21.

The humidity-responsive bridge 25 comprises the resistors $R_{11}$ and $R_{12}$ connected in series across the terminals 70 and 71 of the winding of potentiometer 26. Terminal 70 is connected through a resistor $R_{10}$ to one terminal of the humidity-sensitive network 24. As will be understood by those skilled in the art, the member 24 may comprise either a humidity-responsive resistance alone, or a network circuit containing such a resistance, as shown in the U.S. patent to F. W. Dunmore, 2,285,421, granted June 9, 1942, since the network circuit operates broadly in the same manner as a humidity-responsive resistance. An energizing alternating voltage, for example, 36 volts A.C., is connected between said one terminal and the potentiometer terminal 71. The remaining terminal of network 24 is connected through a resistor $R_{13}$ to the junction of resistors $R_{11}$ and $R_{12}$. Said remaining terminal is connected through a capacitor $C_7$ to the wire 49. A change in resistance of network 24 develops a signal phased so as to cause motor 28 to rebalance bridge 25 and to adjust tap 30 of the humidity function network 32.

The humidity function network 32 comprises the winding of potentiometer 31, to the terminals of which are connected the series resistors $R_{18}$ and $R_{21}$. Said winding has a tap 72 located at a point corresponding to one-sixth of the resistance value of the winding from the connection of resistor $R_{18}$ thereto. A resistor $R_{19}$ is connected between tap 72 and the junction 73 of resistors $R_{18}$ and $R_{19}$. A resistor $R_{20}$ has one terminal thereof connected to the sliding tap 30 of potentiometer 31. Connected between the other terminal of resistor $R_{20}$ and junction 73 are the series resistors $R_{22}$ and $R_{23}$. A suitable energizing alternating potential, for example, 6 volts A.C., is connected across resistors $R_{22}$ and $R_{23}$, as shown. The wire 33 is connected to the junction of resistors $R_{22}$ and $R_{23}$.

As shown, the wire 34 is connected to the sliding tap 30 of potentiometer 31. Connected between wire 33 and wire 34 are the series resistors $R_{16}$ and $R_{17}$. Connected in series between wire 33 and wire 34 are the resistor $R_{14}$ and the winding of the potentiometer 20, having the junction 74.

Potentiometer 20 has a tap 75 located one-quarter of its total resistance value from the wire 34. A resistor $R_{15}$ is connected between tap 75 and junction 74.

The sliding tap 19 of potentiometer 20 is connected to ground through the series-connected attenuator resistors $R_{40}$ and $R_{41}$, comprising the attenuator 52. The wire 51 is connected to the junction of resistors $R_{40}$ and $R_{41}$.

The product bridge 23 comprises the series-connected resistors $R_{24}$ and $R_{25}$ across which are connected in series the resistor $R_{26}$ and the winding of the product potentiometer 35. Also connected across resistors $R_{24}$ and $R_{25}$ in series with a resistor $R_{27}$ is a suitable energizing alternating potential, for example, 3 volts A.C. The sliding tap 36 of potentiometer 35 is connected to ground. The wire 22 is connected between the junction of resistors $R_{16}$ and $R_{17}$ and the junction of resistors $R_{24}$ and $R_{25}$.

From Figure 2 it will be seen that when the temperature bridge 11 is connected to amplifier 14' (when switch arm 42 engages contact 46), the output of the amplifier is connected to temperature servo motor 15 (switch arm 43 engages contact 59). The temperature servo motor 15 then adjusts the temperature potentiometer 17 by moving sliding tap 16, and simultaneously adjusts the temperature function ($f_T$) potentiometer 20 by moving sliding tap 19. This provides a temperature correction signal component in wire 22 (Fig. 3) in accordance with the change in temperature from the reference value, which is applied to product bridge 23 at the junction of resistors $R_{24}$ and $R_{25}$.

At the next step in the cycle, amplifier 14' is connected to the humidity resistance bridge 25 (when switch arm 42 engages contact 48). At this time the amplifier output is connected to dial motor 28 (switch arm 43 engages contact 60), and humidity dial motor 28 adjusts dial potentiometer 26 by moving its sliding contact 29 and simultaneously adjusts the humidity function ($f_D$) potentiometer 31 (Fig. 3) in accordance with the humidity, by moving its sliding contact 30.

The amplifier receives the humidity signal through wire 49 and condenser $C_7$, causing the adjustment of the dial motor 28 and the adjustment of potentiometer 31. Dial motor 28 also adjusts one of the input shafts of the mechanical differential 39.

The total resultant movement of contact 30 of potentiometer 31 (Fig. 3) provides a humidity signal component to the product bridge 23 from bridge 21 through wire 22.

At the next step in the cycle, the amplifier input is connected to the wire 51 (when switch arm 42 engages contact 50) and the amplifier output is connected to the correction servo motor 37 (switch arm 43 engages contact 61). It will be noted that product bridge 23 now receives unbalance current from temperature function network 21 (caused by the adjustment of tap 19), and unbalance current from the humidity function network 32 (caused by the adjustment of tap 30). The output of product bridge 23 is amplified and is applied to the operating winding of motor 37 and is phased to cause motor 37 to move the sliding contact 36 (Fig. 3) of correction potentiometer 35 to rebalance the product bridge 23 and at the same time moves the other input shaft of differential 39. The output shaft member of the differential actuates the relative humidity indicating and printing device 40 to establish the relative humidity reading thereon. Printing occurs at the next step in the cycle, after which the above described cycle is repeated. The resistance values are selected so that the inputs to the respective shafts of the differential mechanism 39 rotates one input shaft in accordance with a change in absolute humidity from a reference value (by the action of motor 28) and rotate the other input shaft by an amount representing the product of the temperature function (by the action of motor 15, which operates in accordance with the change in temperature from a reference value) and the humidity function (by motor 28, in accordance with the change in absolute humidity), so that said other input shaft applies a correction representing an "error" relative humidity to be added algebraically to the rotation of the humidity-responsive input shaft. The device is initially calibrated so that the positions of said input shafts at a given reference absolute humidity and temperature establish the position of the output shaft to indicate the true relative humidity at this temperature. The resistance values are selected so that thereafter any change from the reference temperature produces a temperature signal which, combined with the humidity signal at the new temperature, gives a correction signal representing in effect the "error" relative humidity to be added algebraically to the relative humidity at the reference temperature to give the corrected or true relative humidity at the new temperature.

Since the required correction signal is a function of absolute humidity as well as temperature, it is necessary to combine both temperature and humidity changes from their reference values in order to obtain the required correction signal.

Summarizing, the operation of the circuit illustrated in Figure 3 comprises the following sequential steps:

(1) A temperature change actuates motor 15, to thereby adjust potentiometer contact 16.

(2) Motor 15 also adjusts potentiometer contact 19 of bridge 21.

(3) The temperature change signal component is transmitted to bridge 23 by wire 22.

(4) A humidity change actuates motor 28, to thereby adjust potentiometer contact 29.

(5) Motor 28 also adjusts potentiometer contact 30 of bridge 32.

(6) A humidity change signal component is transmitted to bridge 21 by wire 34.

(7) This corrects the signal to bridge 23. Bridge 21 receive both the humidity change signal and the temperature change signal and computes a correction signal which is applied to motor 37 through bridge 23.

In a practical embodiment of the circuit illustrated in Figure 3, the following values were employed for the parameters of the circuit:

Resistors: Value in ohms
- $R_1$ — 301.2
- $R_2$ — 34.57
- $R_3$ — 35.85
- $R_4$ — 40.33
- $R_5$ — 300.7
- $R_6$ — 117.96
- $R_7$ — 1.39
- $R_8$ — 14.25
- $R_{10}$ — 2000
- $R_{11}$ — 18.0
- $R_{12}$ — 0.2
- $R_{13}$ — 8000
- $R_{14}$ — 680
- $R_{15}$ — 2200
- $R_{16}$ — 1500
- $R_{17}$ — 1500
- $R_{18}$ — 130
- $R_{19}$ — 400
- $R_{20}$ — 70
- $R_{21}$ — 100
- $R_{22}$ — 100
- $R_{23}$ — 100
- $R_{24}$ — 220
- $R_{25}$ — 220
- $R_{26}$ — 100
- $R_{27}$ — 1600
- $R_{39}$ — 1500
- $R_{40}$ — megohms — 1.3
- $R_{41}$ — do — 1.3

Potentiometers: Total resistance in ohms
- 17 — 500
- 26 — 500
- 20 — 10,000
- 31 — 200
- 35 — 500

Capacitors: Capacity in mfds.
- $C_7$ — 0.47

Figure 4:
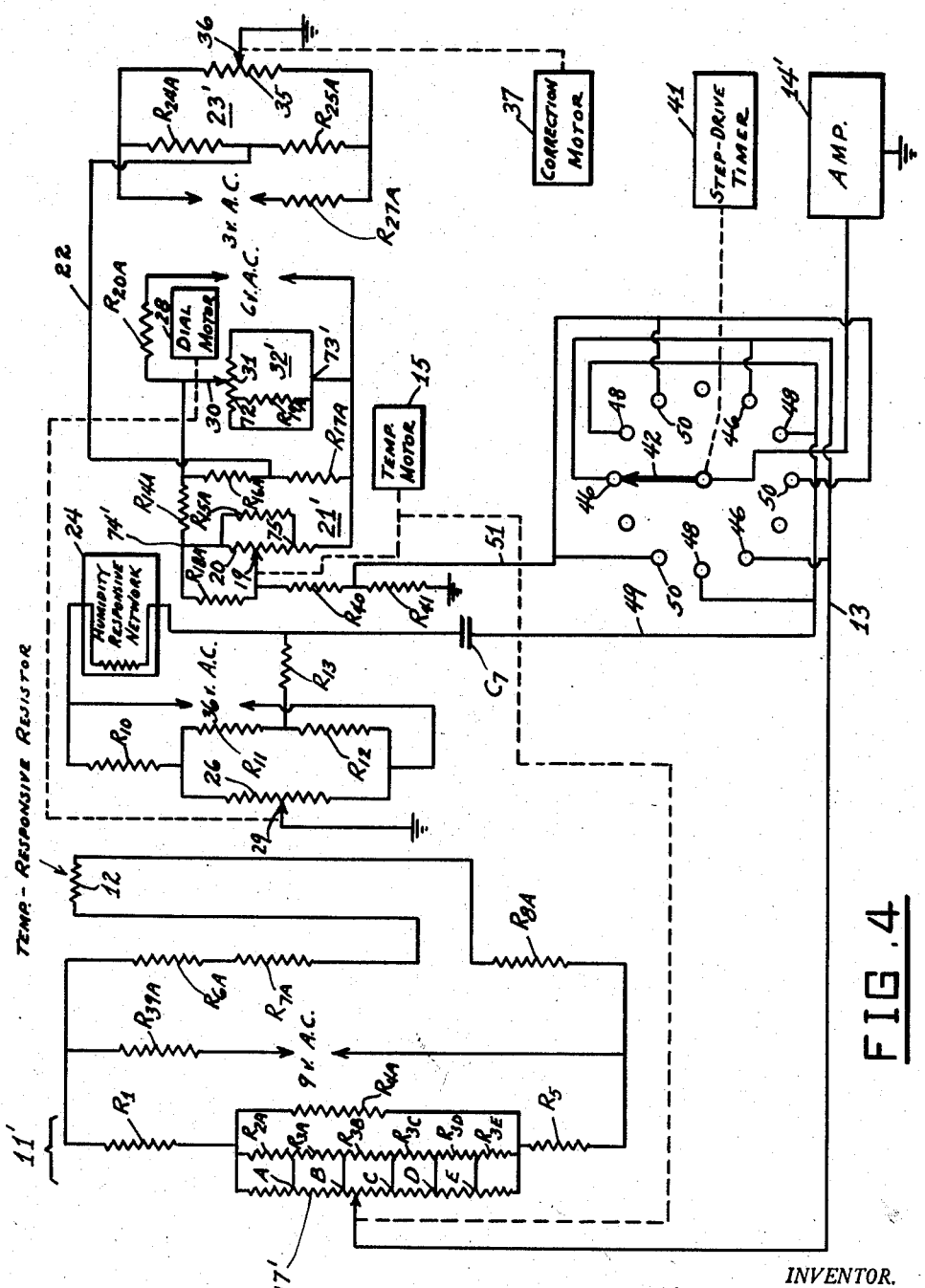
Figure 4 is a schematic wiring diagram of a modified temperature and humidity measuring circuit and relative humidity computing circuits associated therewith, in accordance with the present invention.

The circuit of Figure 4 represents a modification in some respects of the circuit of Figure 3, particularly in the temperature function ($f_T$) and humidity function ($f_D$) networks, shown respectively at 21' and 32', and a revision of the temperature-responsive bridge circuit, shown at 11', to obtain a more accurate temperature correction. In Figure 4 the temperature potentiometer 17' has five equally spaced taps A, B, C, D and E, dividing the potentiometer winding into six equal resistance zones. Connected across the respective zones are the fixed resistors $R_{2A}$, $R_{3A}$, $R_{3B}$, $R_{3C}$, $R_{3D}$ and $R_{3E}$. Connected across the potentiometer is the fixed resistor $R_{4A}$.

The values employed in Figure 4 for the resistors $R_{39A}$, $R_{6A}$, $R_{7A}$ and $R_{8A}$ are different than the values of the corresponding resistors in Figure 3, and the resistance of potentiometer 17' is different from the resistance of potentiometer 17 in Figure 3.

In the $f_T$ network 21', the resistor $R_{15A}$ is different in value from the corresponding resistor $R_{15}$ in Figure 3. Also, the values of resistors $R_{14A}$, $R_{16A}$ and $R_{17A}$ are different from the values of the corresponding resistors $R_{14}$, $R_{16}$ and $R_{17}$ in Figure 3. A resistor $R_{18A}$ is connected between sliding tap 19 and the terminal 74' of potentiometer 20.

In the $f_D$ network 32', the end terminals of potentiometer 31 are connected to a common junction 73' and a fixed resistor $R_{19A}$ is connected betwen the tap 72 of the potentiometer and junction 73'. The resistor $R_{20A}$ in network 32' is different in value from the corresponding resistor $R_{20}$ of Figure 3.

In the product bridge 23', the resistors $R_{24A}$, $R_{25A}$ and $R_{27A}$ are different in value from the corresponding resistors $R_{24}$, $R_{25}$ and $R_{27}$ in Figure 3, and the resistor $R_{26}$ is omitted.

The values of the revised circuit parameters in the modified circuit of Figure 4, in a practical embodiment of the circuit, were as follows:

Resistors: Value in ohms
- $R_{2A}$ — 13
- $R_{3A}$ — 13
- $R_{3B}$ — 24
- $R_{3C}$ — 24
- $R_{3D}$ — 15
- $R_{3E}$ — 15
- $R_{4A}$ — 920
- $R_{6A}$ — 100
- $R_{7A}$ — 20
- $R_{8A}$ — 15
- $R_{39A}$ — 500
- $R_{14A}$ — 2560
- $R_{15A}$ — 1273
- $R_{16A}$ — 2000
- $R_{17A}$ — 2000
- $R_{18A}$ — 1868
- $R_{19A}$ — 55
- $R_{20A}$ — 330
- $R_{24A}$ — 500
- $R_{25A}$ — 500
- $R_{27A}$ — 3373

Potentiometers: Total resistance in ohms
- 17' — 2000

A recording and computing system such as that above described is suitable for general application to derive the value of any primary function (RH), which is also dependent upon a secondary function (T). An instrument constructed according to the above described system is arranged to compute corrections to the primary function as follows:

$$RH = D + f_D f_T$$

where D is the uncorrected primary function, $f_D$ is an empirical function of D, $f_T$ is an empirical function of the secondary function T, and RH is the corrected value of the primary function.

Both of the empirical functions above may have any desired characteristic which can be formed by a potentiometer provided with suitable taps and shunt resistors, coupled to a shaft whose rotation is a linear function of D or T respectively.

For purposes of the present discussion, T and RH are any variables which can be measured by devices forming parts of self-balancing resistance bridges.

For other functions than those included in the specific instruments described, the resistance values and the connection system would be somewhat different from the arrangements shown in Figures 3 and 4; however, the system would still be described by Figures 1 and 2.

While certain specific embodiments of an improved computing and recording apparatus have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. An apparatus of the character described comprising a temperature function network, a temperature-responsive circuit including a temperature-responsive resistance connected to said network and being formed and arranged to develop a first signal in said network in accordance with a temperature change, a humidity function network, a humidity-responsive circuit including a humidity-responsive resistance connected to said second-named network and being formed and arranged to develop a second signal therein in accordance with a change in humidity, means interconnecting said networks and being formed and arranged to develop a third signal in accordance with changes from a predetermined temperature and humidity representing a reference relative humidity, with said third signal representing a corrective relative humidity signal, a mechanical computer having two input elements and an output element driven by said input elements in accordance with the algebraic sum of the movements of the input elements, means actuating one of said input elements in accordance with said second signal, means actuating the other input element in accordance with said third signal and an indicator connected to said output element.

2. An apparatus of the character described comprising a temperature function network, a temperature-responsive circuit including a temperature-responsive resistance connected to said network and being formed and arranged to develop a first signal in said network in accordance with a temperature change, a humidity function network, a humidity-responsive circuit including a humidity-responsive resistance connected to said second-named network and being formed and arranged to develop a second signal therein in accordance with a change in humidity, means interconnecting said networks and being formed and arranged to develop a third signal in accordance with changes from a predetermined temperature and humidity representing a reference relative humidity, with said third signal representing a corrective relative humidity signal, a mechanical computer having two input elements and an output element driven by said input elements in accordance with the algebraic sum of the movements of the input elements, a first servo motor connected to one of said input elements, means driving said first servo motor in accordance with said second signal, a second servo motor connected to the other input element, means driving said second servo motor in accordance with said third signal, and an indicator connected to said output element.

3. An apparatus of the character described comprising a temperature function network, a temperature-responsive circuit including a temperature-responsive resistance connected to said network and being formed and arranged to develop a first signal in said network in accordance with a temperature change, a humidity function network, a humidity-responsive circuit including a humidity-responsive resistance connected to said second-named network and being formed and arranged to develop a second signal therein in accordance with a change in humidity, means interconnecting said networks and being formed and arranged to develop a third signal in accordance with changes from a predetermined temperature and humidity representing a reference relative humidity, with said third signal representing a corrective relative humidity signal, a mechanical differential having two input shafts and an output element rotated by said input shafts in accordance with the algebraic sum of the rotations of the input shafts, a first servo motor connected to one of said input shafts, means driving said first servo motor in accordance with said second signal, a second servo motor connected to the other input shaft, means driving said second servo motor in accordance with said third signal, and an indicator connected to said output element.

4. An apparatus of the character described comprising a temperature function network, a temperature-responsive circuit including a temperature-responsive resistance connected to said network and being formed and arranged to develop a first signal in said network in accordance with a temperature change, a first servo motor, means driving said first servo motor in accordance with said first signal, a first indicator connected to said first servo motor and being formed and arranged to indicate a temperature change in accordance with the actuation of said first servo motor, a humidity function network, a humidity-responsive circuit including a humidity-responsive resistance connected to said second-named network and being formed and arranged to develop a second signal therein in accordance with a change in humidity, a second servo motor, means driving said second servo motor in accordance with said second signal, means interconnecting said networks and being formed and arranged to develop a third signal in accordance with changes from a predetermined temperature and humidity representing a reference relative humidity, with said third signal representing a corrective relative humidity signal, a third servo motor, means driving said third servo motor in accordance with said third signal, a mechanical computer having two input elements and an output element driven by said input elements in accordance with the algebraic sum of the movements of the input elements, means drivingly connecting said second servo motor to one input element and said third servo motor to the other input element, and an indicator connected to said output element.

5. In an apparatus of the character described, a mechanical computer having two movable input elements and an output element driven by said input elements in accordance with the algebraic sum of the movements of the input elements, means moving one of said input elements in accordance with absolute humidity and including a humidity function network provided with variable impedance means mechanically coupled to said one input element and means including said variable impedance means for deriving a signal in said humidity function network in accordance with absolute humidity, a temperature function network provided with second variable impedance means, temperature-responsive means, motor means, means actuating said motor means in accordance with the response of said temperature-responsive means, means mechanically coupling said motor means to said second variable impedance means, whereby to derive a primary signal in said temperature function network in accordance with temperature, means combining said first-named signal with said second-named signal to derive a resultant temperature and humidity correction signal, and means moving the remaining input element in accordance with said correction signal so that the movements of the output element will be in accordance with the algebraic sum of the first-named signal and the correction signal and will represent changes in absolute humidity modified by substantially concurrent correction signals.

6. An apparatus of the character described comprising a temperature-responsive bridge circuit having a temperature-sensitive resistance connected in one of its arms and including an additional variable resistance, a temperature-function network including another variable resistance, a first servo motor drivingly coupled to said two last-named variable resistances, an amplifier, means energizing said first servo motor in a direction to balance said temperature-responsive bridge circuit and to develop a temperature correction signal component in said temperature-function network when the amplifier is connected between the bridge circuit and the servo motor, a humidity-responsive bridge circuit having a humidity-sensitive resistance in one of its arms and including a further variable resistance, a humidity-function network including a still further variable resistance, a second servo motor drivingly coupled to said last-named further variable resistances, means energizing said second servo motor in a direction to balance the humidity-responsive bridge circuit and to develop a humidity correction signal component in said humidity-function network when the amplifier is connected between said humidity-responsive bridge circuit and the second servo motor, a correction bridge circuit including a variable resistance, circuit means connecting said humidity-function network to said temperature-function network and said temperature-function network to said correction bridge circuit to transmit a resultant correction signal to said correction bridge circuit, a third servo motor drivingly coupled to said last-named variable resistance, means energizing said third servo motor in a direction to balance said correction bridge circuit when said amplifier is connected between the correction bridge circuit and said third servo motor, timed switch means formed and arranged to sequentially connect said amplifier between said temperature-responsive bridge circuit and said first servo motor, between said humidity-responsive bridge circuit and said second servo motor, and between said correction bridge circuit and said third servo motor, a mechanical computer having two movable input elements and an output element driven by said input elements in accordance with the algebraic sum of the movements of the input elements, means drivingly coupling said second servo motor to one of said input elements, and means drivingly coupling said third servo motor to the other input element, whereby the movements of the output element will represent changes in absolute humidity modified by subsequent correction signals.

References Cited in the file of this patent

UNITED STATES PATENTS

| | | |
|---|---|---|
| 2,229,156 | Wertheimer | Jan. 21, 1941 |
| 2,684,592 | Hadady | July 27, 1952 |
| 2,707,880 | Wannamaker, Jr. | May 10, 1955 |
| 2,733,607 | Miller | Feb. 7, 1956 |